Nov. 21, 1961    S. SODERBERG ET AL    3,009,678
SELF-CENTERING AND SELF-ALIGNING VALVE DISC
Filed Jan. 25, 1960    2 Sheets-Sheet 1

INVENTORS
STEN SODERBERG
JOHN T. MULLER
BY
ATTORNEYS

INVENTORS
STEN SODERBERG
JOHN T. MULLER
BY
ATTORNEYS

United States Patent Office 3,009,678
Patented Nov. 21, 1961

3,009,678
SELF-CENTERING AND SELF-ALIGNING VALVE DISC
Sten Soderberg and John T. Muller, Nutley, N.J., assignors to Leslie Co., Lyndhurst, N.J., a corporation of New Jersey
Filed Jan. 25, 1960, Ser. No. 4,452
4 Claims. (Cl. 251—85)

This invention relates to fluid valves and, more particularly, to a self-centering and self-aligning valve disc which permits a fluid control valve to be shut off with only a small actuating force.

In regulating valves for steam or water service in heating and cooling system, it is desirable to obtain a valve action which is as sensitive as possible to variations in the demand for the controlled fluid. These variations are generally sensed by a liquid filled thermostatic element. Thus, the actuation provided by the sensing element must generally be amplified in order to obtain valve-control sensitivity, and this amplification results in attenuation of the actuating force.

We have now developed a self-aligning valve disc which permits such smooth and effortless functioning of a regulating valve containing this disc that the valve can be tightly seated with a minimum of operating force. The valve disc of our invention is adapted to close an annular port in a valve body between a valve stem and a concentric annular valve seat. The valve disc comprises an annular disc of greater diameter than that of the annular valve seat and having a central opening of greater diameter than the valve stem. The portion of the disc adjacent the central opening has a configuration which slopes inwardly from the face of the disc toward the central opening, and a compressible ring is positioned proximate the sloping portion of the disc, the ring having an inner diameter substantially smaller than the diameter of the central opening of the disc. The ring is compressed against the sloping portion of the disc and against the valve stem so as to provide a fluid-tight seal between the disc and the stem.

These and other novel features of the valve disc of the invention will be more readily understood from the following description taken in conjunction with the drawings in which FIG. 1 is a side elevation in section of a regulating valve embodying the valve disc of our invention;

Figure 1:
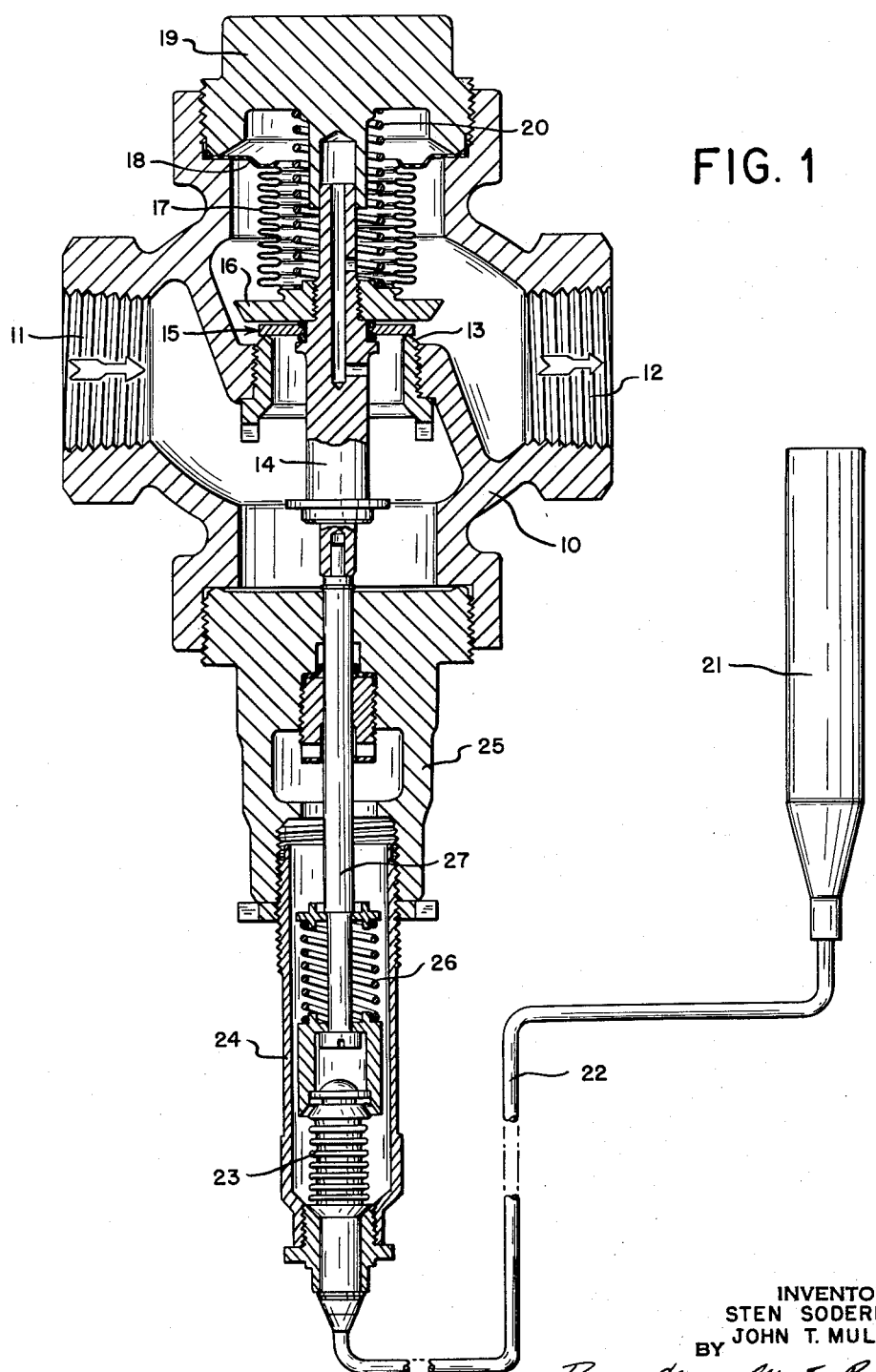

The illustrative valve assembly shown in FIG. 1 is adapted to control the flow of a cooling medium such as water. It must be understood, however, that the self-centering and self-aligning valve disc of the invention is equally applicable to other types of control valves and is not in any way limited to the hereinafter described valve assembly. The valve assembly of FIG. 1 embodying our invention comprises a valve body 10 having an inlet 11 and an outlet 12. Within the valve body is an annular valve seat 13 positioned in the path of fluid flow from the inlet to the outlet. Within the interior of the valve seat is a valve stem which carries the valve disc 15 of the invention in a position immediately above the valve seat 13. The valve stem extends upwardly beyond the valve disc and is screwed into the base flange 16 of a bellows 17. The upper end of the bellows terminates in a flange 18 which is clamped against a shoulder in the upper portion of the valve body by a cap 19. A coil spring 20 surrounding the upper end of the valve stem bears against the inner end of the cap 19 and urges the bellows flange 16 and the valve disc 15 downwardly against the pressure of the thermostatic element.

The thermostatic element comprises a conventional bulb 21 connected by a capillary tube 22 to a bellows 23 mounted within an adjusting sleeve 24. The adjusting sleeve is screwed into the lower end of a valve bonnet 25 which, in turn, is screwed into the lower end of the valve body 10. A coil spring 26 is positioned about an actuating rod 27 so as to provide overload protection for the bellows 23. Thus, an increase in the temperature of the fluid in the bulb 21 causes the bellows 23 to extend and to move the actuating rod 27 and the valve stem 14 upwardly. This raises the valve disc 15 off the valve seat 13 and permits cooling water to flow through the valve.

Figure 2:
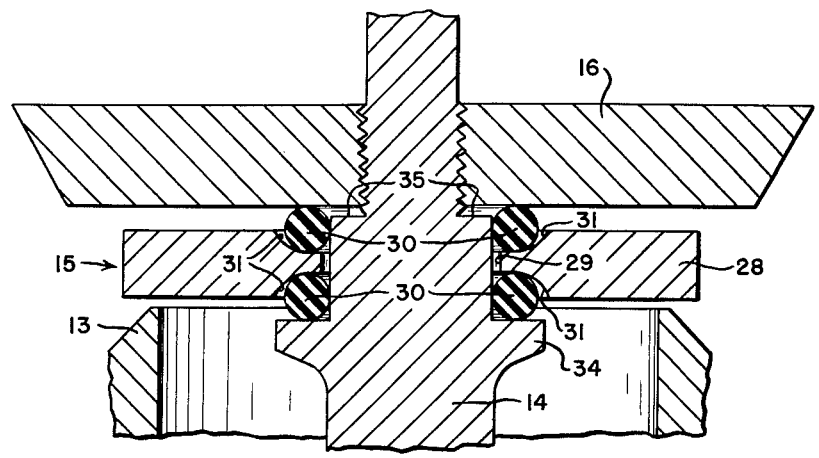
FIG. 2 is a partial sectional view of the valve of FIG. 1 showing in greater detail the construction of the valve disc prior to final assembly.
Figure 3:
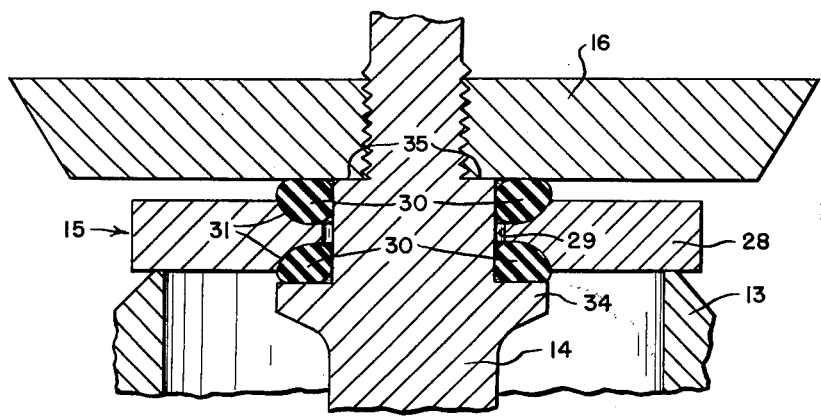
FIG. 3 is the same view as FIG. 2 but showing the valve disc in the final assembly condition.
Figure 5:
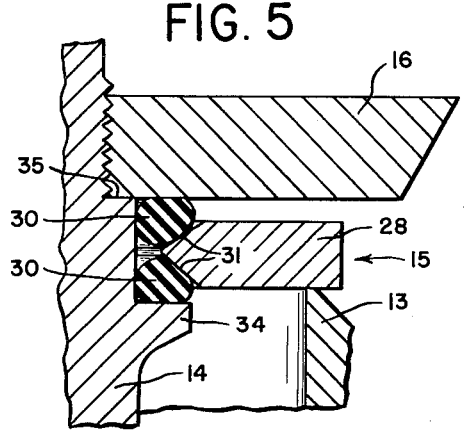
FIGS. 4 and 5 are views similar to FIG. 3 but showing other modifications of the valve disc construction pursuant to the invention.
Figure 4:
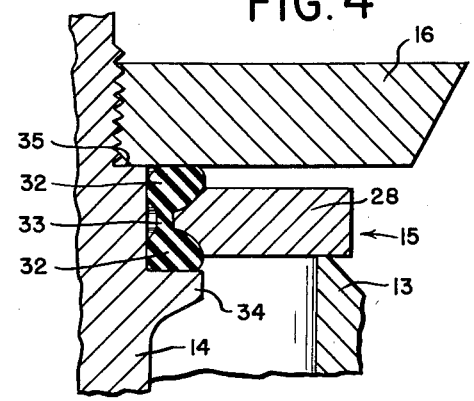

The exceptionally smooth and easy control of the water flow through the valve is provided by the novel construction of the valve disc 15 pursuant to our invention. The disc, as shown in FIG. 1 and in more detail in FIG. 2, comprises an annular disc 28 having a diameter greater than that of the valve seat 13. The disc has a central opening 29 of greater diameter than the valve stem 14 so that there is no metal-to-metal contact between the disc and the stem. The contact between the disc and the stem is provided by an O-ring 30 or the like of compressible material such as rubber or plastic which will not lose its resiliency when it is compressed as described hereinafter. The O-ring has an inner diameter substantially smaller than that of the central opening 29 of the valve disc so that when the ring is compressed it will flatten, as shown in FIG. 3, and make contact with the valve stem 14. Contact between the O-ring and the valve disc is established by providing at least one face, and preferably both faces, of the disc with a sloping surface portion 31 having a configuration which slopes inwardly toward the central opening. In the modifications of FIGS. 2, 3 and 4, this sloping surface is concave and is advantageously of greater radius of curvature than the cross-section of the O-ring, whereas in the modification of FIG. 5 the sloping surface 31 is flat. The concave sloping surface, as can be seen in FIGS. 2 through 4, effectively traps the resilient O-ring by eliminating any direction of flow of the ring under pressure so that fluid pressure on the compressed O-ring does not impart any significant movements to the disc axially of the valve stem 14. The flat sloping surface of FIG. 5 does not trap the O-ring as fully and therefore permits a small controlled amount of movement of the disc axially of the stem 14 under high fluid pressure. However, both of these modifications permit a degree of sealing of the O-ring and positioning of the disc 15 which cannot be achieved by similar O-rings engaging the flat face of an otherwise similar disc. We have found it advantageous for maximum effectiveness of the resilient seal to provide both the top and bottom faces of the disc with these sloping surfaces to provide either two O-rings, as shown in FIGS. 2, 3 and 5, or a double O-ring, as shown in FIG. 4, in which the two ring portions 32 are joined by a connecting sleeve 33.

The disc and O-ring assembly is positioned between an outwardly projecting shoulder 34 formed on the valve stem 14 and the lower face of the base flange 16 of the upper bellows 17. An intermediate shoulder 35 is formed on the valve stem 14 at such a position as to provide a stop for the movement of the stem when it is screwed into the bellows base flange 16. This stop is so arranged that when the valve stem is screwed tightly into the bellows base flange the two O-rings will be tightly compressed against the sloping face portion 31 of the valve disc and against the valve stem 14, as shown in FIG. 3, but not so compressed as to destroy the resilience or integrity of the O-rings. Thus, when the valve disc is moved to the closed-valve position, the pressure of the fluid acting against the O-ring on the high-pressure side of the valve disc further forces the ring against the sloping face portion of the disc and against the valve stem so as to enhance the fluid-tight contact between the valve disc and the valve stem, and the resilience of the O-rings assures alignment of the valve disc with the plane of the valve seat.

This self-centering and self-aligning feature of our novel valve disc structure makes possible complete closure of the valve as soon as the face of the valve disc makes contact with the valve seat, as shown in FIG. 3, with the application of only that amount of closing force which is required to effect planar alignment between the flexibly mounted valve disc and the valve seat. This modest force is readily supplied by the thermostatic element in the cooling-type regulating valve used herein to illustrate the operation of our novel valve disc, and it will be readily appreciated that an equally sufficient force is supplied by the bellows-restraining spring when the bonnet and cap portions of the regulating valve are reversed to provide a heating-type control valve. In addition, the symmetrical shape of the valve disc permits it to be turned over for further use whenever the disc face originally in contact with the valve seat becomes worn.

We claim:

1. A self-centering and self-aligning valve disc adapted to close an annular port in a valve body between a valve stem and a concentric annular valve seat and comprising an annular disc of greater diameter than that of the annular valve seat and having a central opening of greater diameter than the valve stem, the portion of the disc adjacent both ends of the central opening having a configuration which slopes inwardly from the face of the disc toward the central opening, and a compressible ring positioned proximate each of the sloping portions of the disc and having an inner diameter substantially smaller than the diameter of the central opening of the disc, the rings being compressed by shoulder elements associated with the valve stem and against their respective sloping portions of the disc and against the valve stem so as to provide a fluid-tight seal between the disc and the stem without metal-to-metal contact, the disc thus being resiliently supported with respect to the axis of the valve stem so as to permit self-alignment with the valve seat.

2. A self-centering and self-aligning valve disc adapted to close an annular port in a valve body between a valve stem and a concentric annular valve seat and comprising an annular disc of greater diameter than that of the annular valve seat and having a central opening of greater diameter than the valve stem, the portion of the disc adjacent the central opening on both sides having a configuration which slopes inwardly from the face of the disc toward the central opening, and a compressible ring positioned proximate each of the sloping portions of the disc and having an inner diameter substantially smaller than the diameter of the central opening of the disc, the rings being compressed by shoulder elements associated with the valve stem and against their respective sloping portions of the disc and against the valve stem so as to provied a fluid-tight seal between the disc and the stem, the valve stem having a stop positioned so as to arrest its longitudinal ring-compressing motion when the rings have been forced against the sloping portions of the disc and against the valve stem by said compression thereby centering the valve disc in fluid-tight contact with the stem in the absence of metal-to-metal contact, the disc thus being resiliently supported with respect to the axis of the valve stem so as to permit self-alignment with the valve seat regardless of the direction of flow of a fluid through the port and self-sealing to insure fluid tightness between the disc and stem.

3. A self-centering and self-aligning valve disc adapted to close an annular port in a valve body between a valve stem and a concentric annular valve seat and comprising an annular disc of greater diameter than that of the annular valve seat and having a central opening of greater diameter than the valve stem, the portion of the disc adjacent the central opening having a concave configuration which slopes inwardly from each face of the disc toward the central opening, and a compressible ring positioned proximate each sloping portion of the disc and having an inner diameter substantially smaller than the diameter of the central opening of the disc, each of the rings being compressed between its adjacent sloping portion of the valve disc and a shoulder associated with the valve stem so as to force the rings against the sloping portions of the disc and against the valve stem and thereby provide a fluid-tight seal between and centering of the disc and the stem in the absence of metal-to-metal contact, the disc thus being resiliently supported with respect to the axis of the valve stem so as to permit self-alignment with the valve seat regardless of the direction of flow of a fluid through the port, and the enclosure of the rings between the valve disc, the valve stem shoulders, the valve stem and the sloping portions of the valve disc central opening preventing plastic flow of the rings under hydraulic pressure existing within the valve.

4. A self-centering and self-aligning valve disc adapted to close an annular port in a valve body between a valve stem and a concentric annular valve seat and comprising an annular disc of greater diameter than that of the annular valve seat and having a central opening of greater diameter than the valve stem, the portion of the disc adjacent the central opening having a substantially flat configuration which slopes inwardly from each face of the disc toward the central opening, and a compressible ring positioned proximate each sloping portion of the disc and having an inner diameter substantially smaller than the diameter of the central opening of the disc, each of the rings being compressed between its adjacent sloping portion of the valve disc and a shoulder associated with the valve stem so as to force the rings against the sloping portion of the disc and against the valve stem and thereby provide a fluid-tight seal between and centering of the disc and the stem in the absence of metal-to-metal contact, the disc thus being resiliently supported with respect to the axis of the valve stem so as to permit self-alignment with the valve seat regardless of the direction of flow of a fluid through the port, and the enclosure of the rings between the valve disc, the valve stem shoulders, the valve stem and the sloping portions of the valve disc central opening preventing plastic flow of the rings under hydraulic pressure existing within the valve.

References Cited in the file of this patent

UNITED STATES PATENTS

| | | |
|---|---|---|
| 1,944,900 | Miller | Jan. 30, 1934 |
| 2,712,427 | Welborn | July 5, 1955 |
| 2,749,895 | Flint | June 12, 1956 |